(12) United States Patent
Miyanaga (10) Patent No.: US 6,926,476 B1
(45) Date of Patent: Aug. 9, 2005

(54) CORE BODY LOCK DEVICE OF CORE DRILL AND CORE BODY USED FOR THE DEVICE

(75) Inventor: Masaaki Miyanaga, Miki (JP)

(73) Assignee: Kabushiki Kaisha Miyanaga, Hyogo (JP)

( * ) Notice: Subject to any disclaimer, the term of this patent is extended or adjusted under 35 U.S.C. 154(b) by 0 days.

(21) Appl. No.: 10/129,034

(22) PCT Filed: Mar. 9, 2000

(86) PCT No.: PCT/JP00/01425

§ 371 (c)(1),
(2), (4) Date: Aug. 26, 2002

(87) PCT Pub. No.: WO01/38027

PCT Pub. Date: May 31, 2001

(30) Foreign Application Priority Data

Nov. 19, 1999 (JP) ................................. 11-329757

(51) Int. Cl.[7] ............................................. B23B 51/04
(52) U.S. Cl. ................................. 408/204; 408/239 R
(58) Field of Search ...... 408/204, 239 R; B23B 51/04

(56) References Cited

FOREIGN PATENT DOCUMENTS

| JP | 02292107 A | * 12/1990 | ............ B23B 51/04 |
|----|------------|-----------|------------------------|
| JP | 04-075813 | 3/1992 | |
| JP | 04-105811 | 4/1992 | |
| JP | 06238506 A | * 8/1994 | ............ B23B 51/04 |
| JP | 08090325 A | * 4/1996 | ............ B23B 51/04 |
| JP | 09-117814 | 5/1997 | |
| JP | 2000246727 A | * 9/2000 | ............ B28D 1/14 |
| JP | 2000326126 A | * 11/2000 | ............ B23B 51/04 |
| JP | 2001162423 A | * 6/2001 | ............ B23B 51/04 |
| JP | 2001162424 A | * 6/2001 | ............ B23B 51/04 |
| JP | 2002120218 A | * 4/2002 | ............ B28D 1/14 |

* cited by examiner

Primary Examiner—Daniel W. Howell
Assistant Examiner—J Williams
(74) Attorney, Agent, or Firm—Marshall, Gerstein & Borun LLP (57) ABSTRACT

It is an object to provide a locking device of a core drill which automatically locks a core body when the core body is attached to a base body, the coupling relation between the base body and the core body being fixed unless an unlocking operation is performed by an act of worker, wherein in the core drill including the base body and the core body which are connected to each other by the engagement of an engagement projection with an engagement concave portion, an engagement pawl of the locking device is disposed on the base body, and under the condition that the engagement projection engages the engagement concave portion, the engagement pawl being biased by a compression spring is caused to descend to a back portion of the engagement projection to fix the engagement projection within the engagement concave portion thereby locking the core body.

8 Claims, 6 Drawing Sheets

CORE BODY LOCK DEVICE OF CORE DRILL AND CORE BODY USED FOR THE DEVICE

TECHNICAL FIELD

The present invention relates to a "core body locking device" of a core drill having a cylindrical core body and a base body to which the core body is attached, which is capable of attaching the core body to the base body and locking the core body, and to a "core body" for use therein.

More specifically, it relates to a core body locking device of a core drill capable of detaching a cylindrical core body from a base body, wherein the state of coupling between the base body and the core body is fixed so firmly that their coupling state will not be impaired due to impact or the like whereby the core drill is suited to drill an object to be cut such as concrete or stone, and to a core body for use therein.

BACKGROUND ART

Conventionally, practical use has been widely made of a core drill which uses a cylindrical core body having a drilling blade at a lower end edge thereof to drill a large-diameter hole.

A core drill of this type comprises a core body and a base body. The base body having a shank at an upper part thereof has a attaching portion at a lower part thereof, a core body attaching portion with a shoulder portion having a step portion around the attaching portion, engagement grooves situated at plural locations on the outer periphery of the core body attaching portion, each engagement groove comprising a longitudinal groove portion and a transverse groove portion continuous therewith, which is concave in section and appears like a hook when viewed from outside, and a restraining ball biased to protrude into the transverse groove portion of each engagement groove by a compression spring thereby holding the engagement projection at an engagement terminal point in order to keep the coupling to the core body. On the other hand, the core body has the engagement projection corresponding to each engagement groove, the engagement projection extending inwardly from an inner peripheral surface of an upper end portion of the cylindrical core body having a drilling blade at a lower end edge thereof.

The attaching the core body to the base body is achieved by attaching the upper end portion of the core body to the core body attaching portion of the base body to cause the engagement projections on the core body side to engage the engagement grooves on the base body side with the restraining balls being caused to pass through the engagement projections against the biasing force of the compression spring.

Such a prior art is described in Japanese Utility Model Examined Gazette No. HEI 7-39527 for example.

The core drill of the aforementioned construction allows the core body to be attached to or detached from the base body easily and hence is excellent in that, for example, when it is employed as a cutting tool of a drilling machine such as an electric drill, the two are separated from each other to allow masses resulting from cutting, which are left within the core body after drilling of concrete, stone or the like, to be removed easily.

Though the aforementioned core drill of the construction allowing attaching and detaching the core body to or from the base body is excellent in that the state of coupling between the base body and the core body is stably maintained during a drilling operation by the arrangement of the hook-shaped engagement grooves and the restraining balls if the core drill drills an object at constant revolutions, the core drill has the following inconvenience if it is used as a cutting tool of a "rotary hammer drill", a sort of drilling machine, to drill concrete, stone or the like. That is, since the "rotary hammer drill" imparts periodical axial strikes together with rotation to the core body side from the drilling machine side, impactive forces are exerted on the cutting tool side during the drilling operation to cause the coupling between the base body and the core body to rattle thereby making the coupling state thereof unstable.

Recently, electric drills of the type having a braking mechanism such as to rapidly stop rotation have been commercially available. When the core drill is used with an electric drill of this type, rapid braking during rotation makes the state of coupling between the base body and the core body unstable due to rotational inertia.

The present invention has been made in view of the aforementioned present circumstances, and it is an object of the present invention to provide a core body locking device of a core drill which is free of any one of the aforementioned inconveniences as well as a core body for use therein.

DISCLOSURE OF INVENTION

With a view to solving the aforementioned technical problems, a first invention of the present invention provides a core body locking device of a core drill wherein: a base body having a shank at an upper part thereof is provided with a attaching portion at a lower part thereof, the attaching portion being provided with a core body attaching portion having a shoulder portion formed by a step portion at an outer periphery thereof, the core body attaching portion being provided with an engagement concave portion; a cylindrical core body having a drilling blade at a lower end edge thereof is provided with an engagement projection protruding inwardly from an internal surface of the core body at an internal surface of an upper end portion of the core body; and the core body is attached to the core body attaching portion of the base body by engagement of the engagement projection of the core body with the engagement concave portion of the base body, characterized in that:

the core body attaching portion of the base body is provided with a concave groove portion circumferentially adjacent to and continuous with the engagement concave portion and extending therefrom to an lower end of the base body; and a stopper member which has a lower end portion with an engagement pawl that is vertically movable within the concave groove portion and which is downwardly biased by a spring is disposed on the base body, wherein when the engagement pawl of the stopper moves to an unlocking position at an upper location, the concave groove portion of the core body attaching portion becomes continuous with the engagement concave portion, while when the engagement pawl moves to a locking position at a lower location, the engagement concave portion becomes separated from the concave groove portion by the engagement pawl.

In the core drill thus constructed according to the first invention, at the time of coupling between the base body and the core body the engagement pawl of the stopper member on the base body side under the biasing by the compression spring descends to a back portion of the engagement projection to press against and lock the engagement projection from behind under the condition that the engagement projection of the core body engages the engagement concave portion of the core body attaching portion, so that the engagement projection is locked from circumferentially opposite sides by the engagement concave portion and the engagement pawl, whereby the core body is locked so as not to rotate relative to the base body. Accordingly, even if the core drill is used with a rotary hammer drill or the like, the coupling between the base body and the core body is not released during the drilling operation and, hence, the interlocking state of the two is constantly fixed. That is, the core drill is of an excellent construction which is capable of constantly holding the core body as fixed to the base body even if two external forces, rotation and periodical strikes, work on the core body at the same time to cause an impactive force to be exerted on the core body as in a rotary hammer drill.

In the coupling operation, the base body and core body of the core drill according to the first invention act as follows. That is, as the upper end portion of the core body is inserted into the concave groove portion of the core body attaching portion of the base body from below, the engagement projection of the core body pushes up the engagement pawl of the stopper member vertically movably disposed within the concave groove portion against the force of the spring biasing the stopper member downwardly, so that the engagement concave portion, which has been detached from the concave groove portion by the engagement pawl, becomes continuous with the concave groove portion. Under this condition, rotating the core body relative to the base body causes the engagement projection of the core body to move to the engagement concave portion from the concave groove portion of the base body, so that the engagement projection engages the engagement concave portion. The move of the engagement projection to the engagement concave portion causes the lower end of the engagement pawl to come off the engagement projection, so that the engagement pawl biased downward by the spring descends to the back portion of the engagement projection. The descent of the engagement pawl causes the back portion of the engagement projection to be blocked with the engagement pawl thereby locking the engagement projection with the engagement concave portion and the engagement pawl.

In this way, such a coupling operation enables the core body to be attached to the base body with one touch. Accordingly, this arrangement is also excellent in operability in addition to the aforementioned effects provided by the present invention and, hence, the operability is improved.

In the construction described above, if an arrangement is provided wherein: the engagement concave portion is formed such that when the engagement projection is in a state engaging the engagement concave portion, the engagement projection is locked with its back portion sticking out toward the engagement concave portion, while the engagement pawl of the stopper is provided with a concave notch portion for receiving the back portion of the engagement projection; and when the engagement projection sticking out from the engagement concave portion is caused to enter the concave notch portion of the engagement pawl, the engagement pawl circumferentially presses against the back portion of the engagement projection by the biasing of the spring to lock the engagement projection of the core body, the back portion of the engagement projection is held more stably by the concave notch portion of the engagement pawl and, hence, the engagement projection is stably locked between the engagement concave portion and the engagement pawl. Thus, there is no possibility that the core body rattles relative to the base body even if the core body is subjected to two actions, i.e., rotation and periodical strikes as in a rotary hammer drill.

In the construction described above, if concave groove portions of the core body attaching portion are formed at three points equally distributed on an outer periphery of the core body attaching portion, while, correspondingly thereto, engagement projections of the core body are provided at three points equally distributed on an inner periphery of the core body, such an arrangement allows the stopper member to move stably while ensuring firm coupling.

With a view to solving the aforementioned problems, a second invention of the present invention provides a core body of a core drill which is engageable with and lockable to a base body when the core body is in a state attached to the base body, the base body being such that: the base body having a shank at an upper part thereof is provided with a attaching portion at a lower part thereof, the attaching portion being formed at an outer periphery thereof with a core body attaching portion having a shoulder portion comprising a step portion; the core body attaching portion is provided with an engagement concave portion and a concave groove portion circumferentially adjacent to and continuous with the engagement concave portion and extending therefrom to an lower end of the base body; and a stopper member which has a lower end with an engagement pawl that is vertically movable within the concave groove portion and which is downwardly biased by a spring is disposed on the base body, wherein when the engagement pawl of the stopper moves to an unlocking position at an upper location, the concave groove portion of the core body attaching portion becomes continuous with the engagement concave portion, while when the engagement pawl moves to a locking position at a lower location, the engagement concave portion becomes separated from the concave groove portion by the engagement pawl, characterized in that the core body is provided with an inwardly protruding engagement projection on an internal surface of an upper end portion of the core body at a location corresponding to the location of the concave groove portion, the engagement projection being capable of passing through the concave groove portion and engaging the engagement concave portion.

The core body thus constructed is suitable as a core body to be used in the aforementioned core body locking device.

In the core body having the construction described above, if the engagement projection comprises a hemispherical projection, the core body becomes easy to manufacture and allows the engagement projection to pass through the concave groove portion easily, to move from the concave groove portion to the engagement concave portion easily, and to be locked at the engagement concave portion easily.

In the core body having the construction described above, if the engagement projection is formed at a location that is lower than an upper end of the core body to such an extent that at least an upper edge of the engagement projection does not contact the upper end of the core body, the core body can be manufactured easily and attached to the base body stably and does not lengthen the shaft length of the core drill than necessary.

Further, in the core body having the construction described above, if the diameter of a lower end portion of the core body where the drilling blade is formed is different from the diameter of a portion of the core body to be attached to the base body, such an arrangement is excellent in that the rigidity of the whole core body can be improved by virtue of an improvement in geometric moment of inertia and the like. Also, such an arrangement is excellent in that it can be applied to various core bodies adapted to drill holes having different diameters for use with a common base body.

BEST MODE FOR CARRYING OUT THE INVENTION

Hereinafter, a core body locking device of a core drill and a core body used in the device according to an embodiment of the present invention will be specifically described with reference to the drawings. However, the present invention is not limited to this embodiment. One mode for carrying out the present invention is described below with reference to the drawings.

Figure 1:
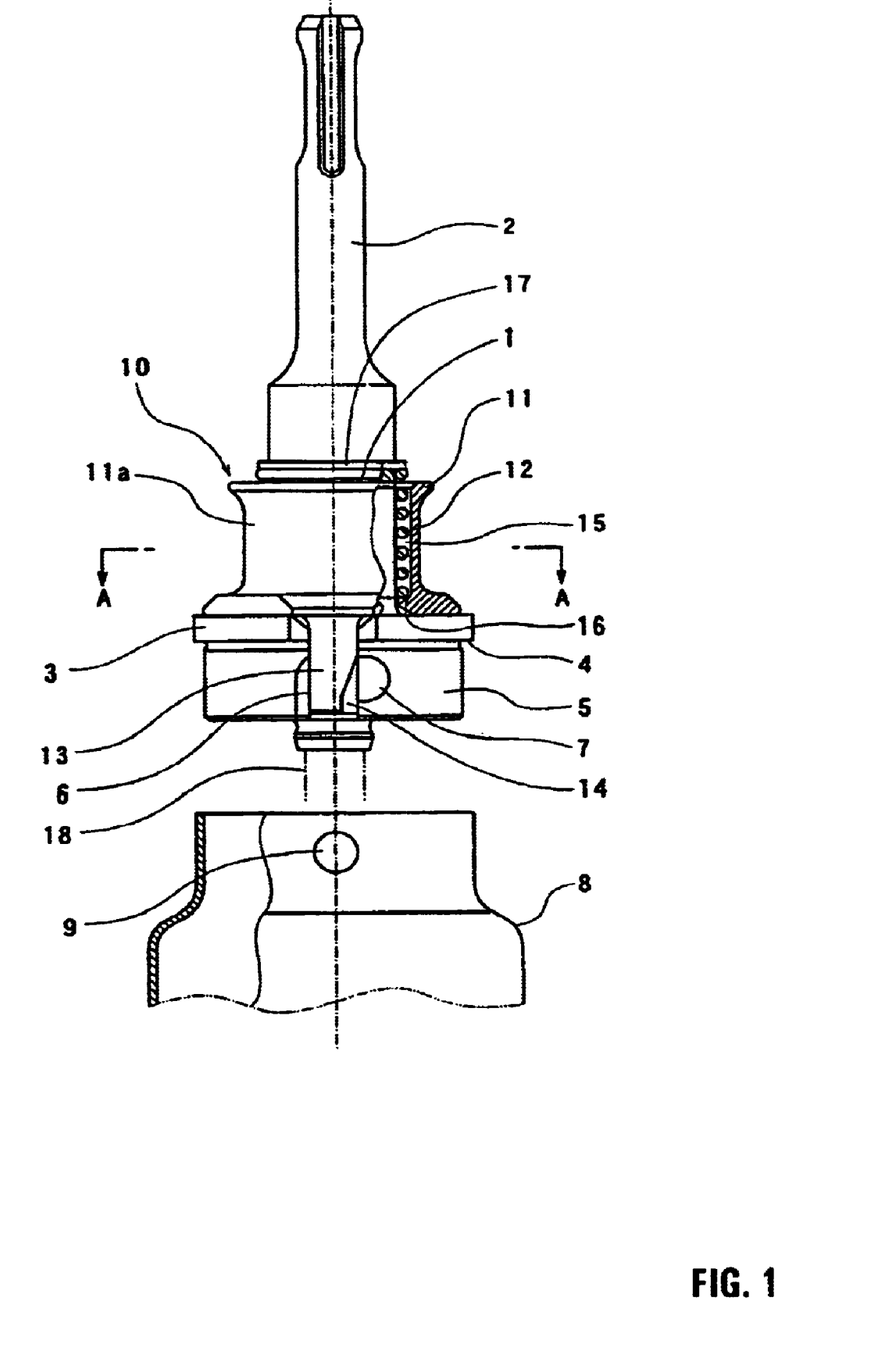
FIG. 1 is a partially sectional, exploded front view of a core drill showing an embodiment of the present invention.
Figure 2:
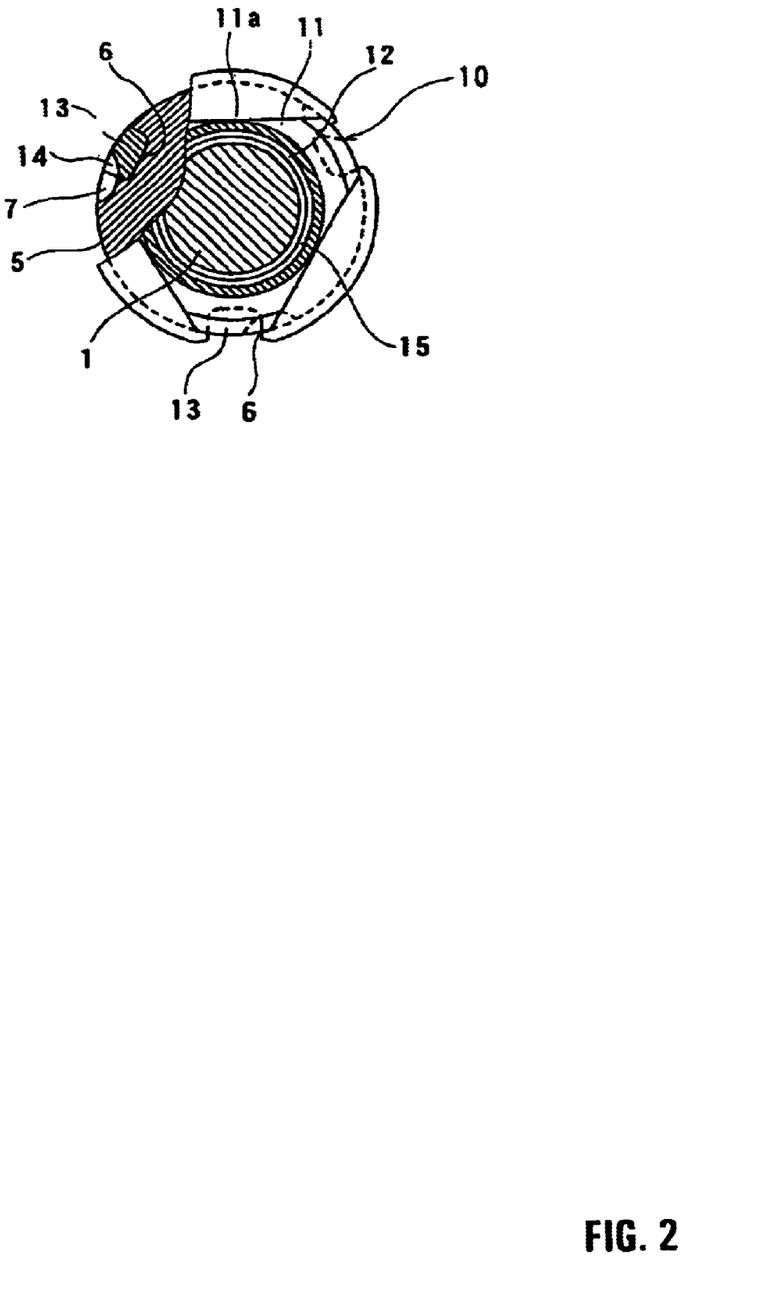
FIG. 2 is a sectional view taken along line A—A and as viewed in the direction indicated by arrow in FIG. 1.

In FIGS. 1 and 2, reference numeral 1 denotes a base body having a shank 2 extending upwardly from a central portion of an upper surface of the base body 1. The shank 2 is chucked to the driving shaft (not shown) of a drilling machine side by chucking. The base body 1 has a attaching portion 3 at a lower part thereof. The attaching portion 3 has a core body attaching portion 5 on an outer periphery thereof. The core body attaching portion 5 has a shoulder portion 4 formed a step portion at an upper portion thereof.

Correspondingly to engagement pawls 13 to be described later, concave groove portions 6 each having an lower end opening to a lower end side of the base body 1 and extending from the shoulder portion 4 to a lower end of the core body attaching portion 5 are formed at three points equally distributed on the outer periphery of the attaching portion 3. An outer peripheral surface of the core body attaching portion 5 situated below the shoulder portion 4 is provided with engagement concave portions 7 extending sidewardly (circumferentially) from respective concave groove portions 6. Engagement concave portion 7 is sized so that when it receives therein an engagement projection 9 of a core body 8 to be described later, a back portion (or a portion of the back portion) of engagement projection 9 sticks out toward the concave groove 6 side.

On the other hand, the core body 8 to be attached to the base body 1 has a cylindrical shape as a whole and is provided with a drilling blades (not shown) comprising a carbide tip at its lower end edge. Further, the engagement projections 9, which are adapted to pass through the concave groove portions 6 of the core body attaching portion 5 and engage the engagement concave portions 7 in the coupling of the core body 8 to the base body 1 side, are formed to protrude inwardly at three points equally distributed on an inner periphery of an upper end portion of the core body 8. In this embodiment, engagement projection 9 comprises a hemispherical projection. Engagement projection 9 is formed at a location that is lower than the upper end of the core body 8 to such an extent that at least an upper edge of engagement projection 9 does not contact the upper end of the core body 8. Specifically, in the case of this embodiment engagement projection 9 is formed at a location such that the upper edge of engagement projection 9 is positioned at a location that is 1.5 to 2 mm lower than the upper end of the core body 8. The core body 8 has a different (larger) diameter at a portion extending from a location slightly lower than the upper end portion where engagement projections 9 are formed and, hence, the core body 8 has an enhanced rigidity, particularly against a rotating torque or an axial buckling load.

In the embodiment according to the present invention, a stopper member 11 is disposed on the base body 1 so that the stopper member 11 and the engagement concave portion 7, serve as a locking device 10. The stopper member 11 is vertically movably disposed relative to the base body 1 and downwardly biased by a compression spring (a spring acting to assume its expanded state from its contracted state) 12. The stroke of vertical movement of the stopper member 11 is equal to the moving stroke of engagement pawl 13 from an unlocking position at an upper location to a locking position at a lower location. Even if engagement pawl 13 is movable to an upper location than the unlocking position, the basic effect of this embodiment will result unless engagement pawl 13 comes off concave groove portion 6.

The stopper member 11 has a lower portion configured to sliding-contact with a straight outer periphery having a circular section formed above the attaching portion 3 of the base body 1 so that the stopper member 11 can vertically move smoothly relative to the base body 1. Further, at a portion above the sliding contact portion is defined a spring-receiving cylindrical space 15 between an outer peripheral surface of the base body 1 and an inner peripheral surface of a cylindrical main body 11a of the stopper member 11. In the space 15 is accommodated a single compression spring 12 having a winding diameter substantially equal to a central diameter of the space 15. The spring 12 has a lower end pressed against a receiving step (receiving seat) 16 formed at an inner peripheral wall of the cylindrical main body 11a of the stopper member 11 and an upper end stopped by a stop ring 17 attached over the base body 1. Thus, the spring 12 acts to bias the stopper member 11 downwardly relative to the base body 1.

The engagement pawls 13, which protrude downward, are located on the circumference of the outer peripheral edge of the lower end of the stopper member 11 at three points corresponding to the locations of the concave groove portions 6 so as to be capable of moving vertically within respective concave groove portions 6 and to correspond to the concave groove portions 6. When engagement pawl 13 moves to the unlocking position at an upper location within concave groove 6, concave groove portion 6 becomes continuous with engagement concave portion 7, that is, engagement projection 9 of the core body 8 becomes freely movable between concave groove portion 6 and engagement concave portion 7. On the other hand, when engagement pawl 13 moves to the locking position at a lower location within concave groove portion 6, engagement concave portion 7 becomes separated from concave groove portion 6 by engagement pawl 13, that is, engagement projection 9 protruding into the core body 8 assumes a locked state where engagement projection 9 is incapable of moving from engagement concave portion 7 to concave groove portion 6. Stated otherwise, engagement pawl 13 of the stopper member 11 acts to lock engagement projection 9 relative to engagement concave portion 7 from behind engagement projection 9 or to release this locked state.

In this embodiment, engagement pawl 13 has a concave notch portion 14 shaped like a cutout (a partial bowl shape) at a lower edge portion on the right-hand side and adapted to smoothly abut (or conform in shape to) a portion, which sticks out toward concave groove portion 6 from engagement concave portion 7, of engagement projection 9 at the locking position for receiving that portion (or a part of that portion). Thus, the process until engagement pawl 13 locks engagement projection 9 proceeds as follows. That is, engagement projection 9 pushes up engagement pawl 13, passes through concave groove portion 6 and engages engagement concave portion 7. After this engagement has been made, engagement pawl 13 descends to the back portion of engagement projection 13 to cause the back portion of engagement projection 9 sticking out toward concave groove portion 6 to enter concave notch portion 14 so that engagement projection 9 is locked as pressed against engagement pawl 13 under the biasing by the compression spring 12, thereby holding and fixing engagement projection 9 within engagement concave portion 7.

In the case of the core drill according to this embodiment, a center drill 18 is provided as located in the core body 8 and extending from the center of the base body 1 through the core body 8 to beyond the front end of the core body 8. Though not shown, the center drill 18 has a base portion unrotatably attached into a drill attaching hole located centrally of the underside of the base body 1 and is axially secured by means of fixing screws screwing from the side direction of the base body. The basic construction of the core drill 18 in which the core body 8 and the center drill 18 are assembled with the base body 1 is the same as that of a well-known core drill.

Next, description with reference to FIGS. 3 to 5 will be made of operations of each component in the attaching and detaching the core body 8 of the core drill to or from the base body 1 having the construction described above.

Figure 3:
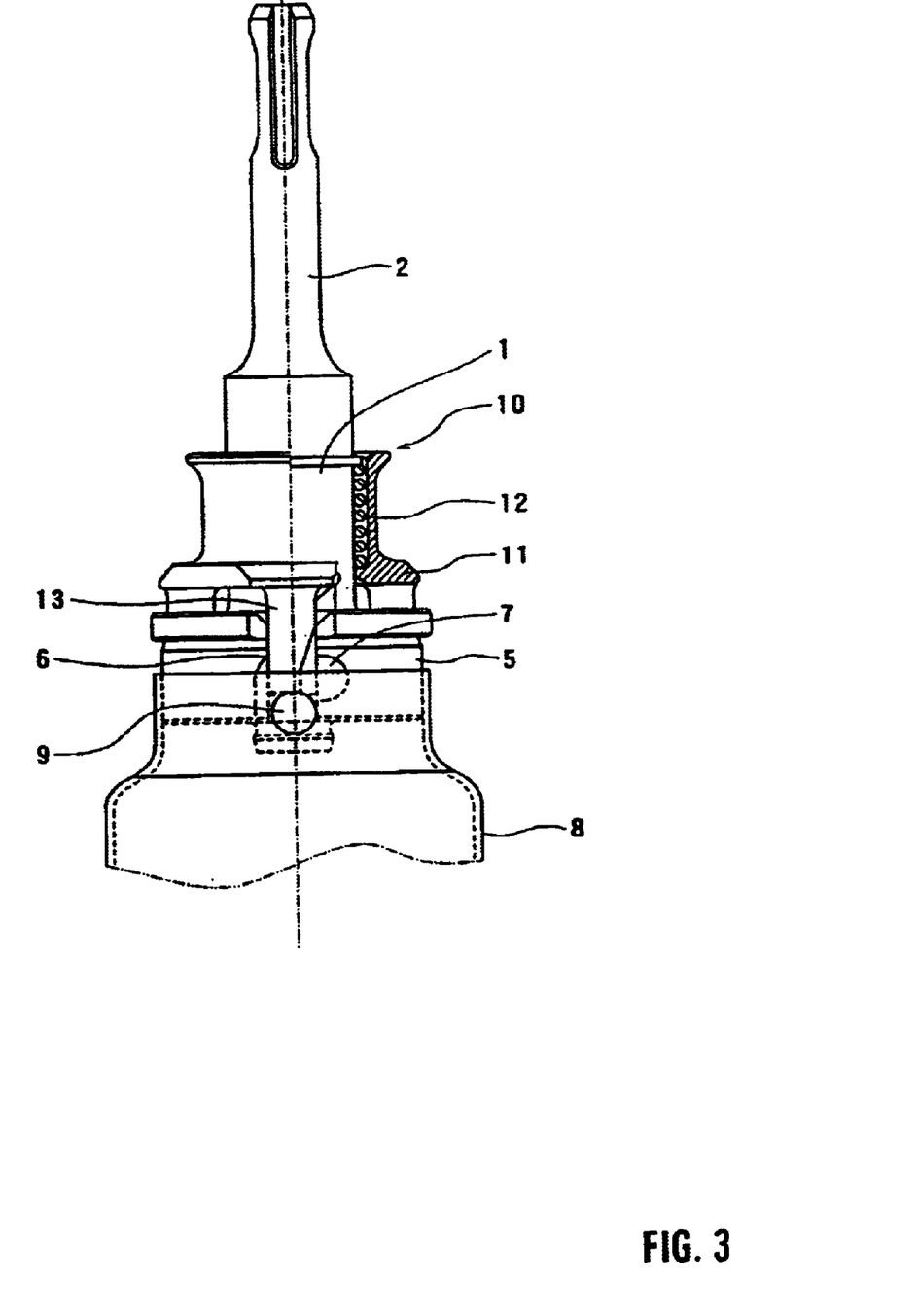
FIG. 3 is a partially sectional view showing a state immediately after the beginning of insertion for illustrating the manner of coupling between the base body and the core body.
Figure 4:
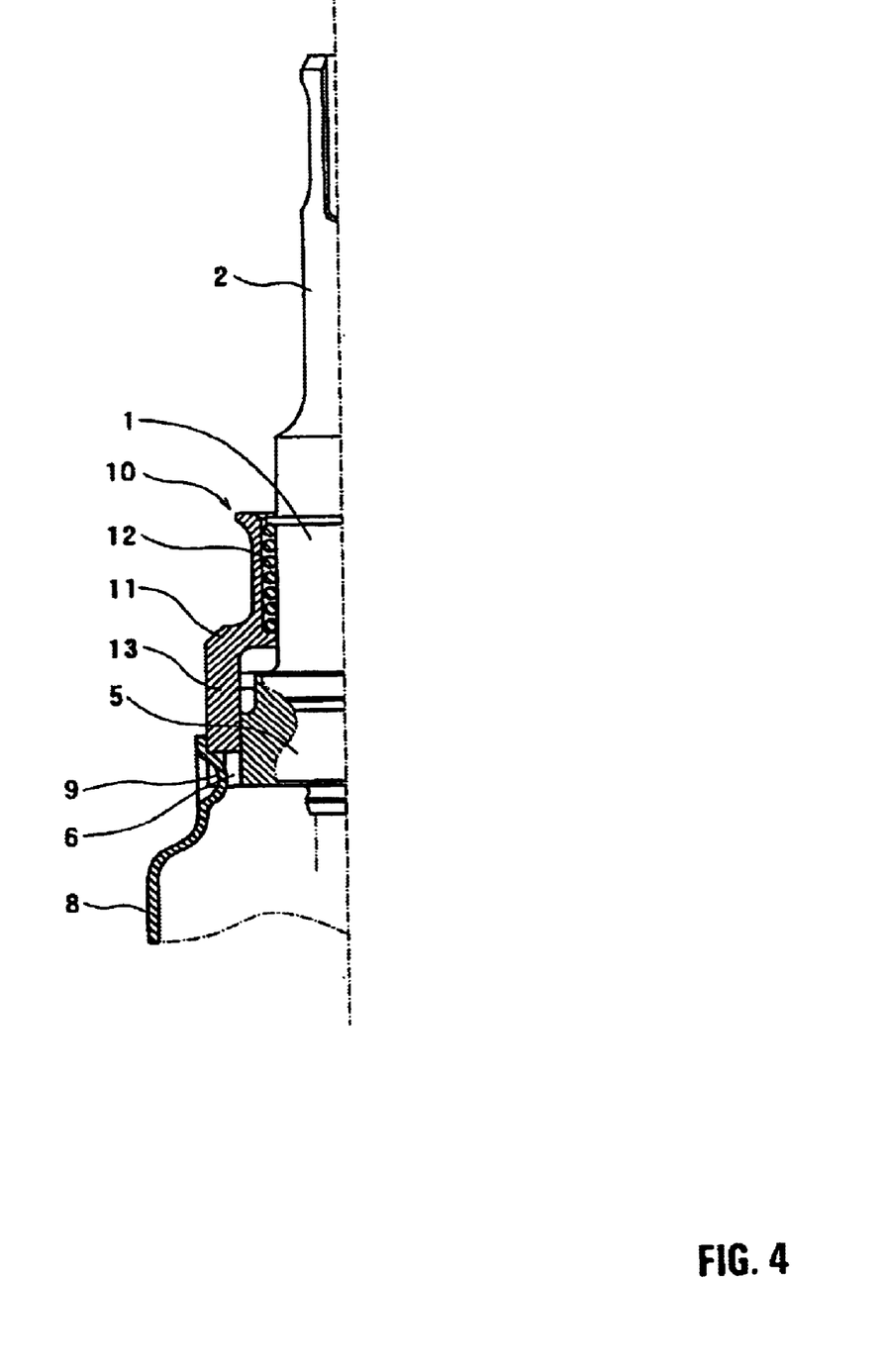
FIG. 4 is a view illustrating the manner of coupling between the base body and the core body, which shows the same state of insertion as in FIG. 3 as viewed from a different angle.

Referring to FIGS. 3 and 4, an operator holds the shank portion 2 with one hand and the cylindrical portion of the core body 8 with the other hand to align engagement projection 9 of the core body 8 with the lower end of pawl 13 at a position lowered within concave groove portion 6 of the core body attaching portion 5 under the biasing by the spring 12. As the core body attaching portion 5 of the base body 1 is inserted into the upper end portion of the core body 8 so that engagement projection 9 moves upward within concave groove portion 6, engagement pawl 13 is pushed upward (toward the shank 2 side) against the compression spring 12.

Figure 5:
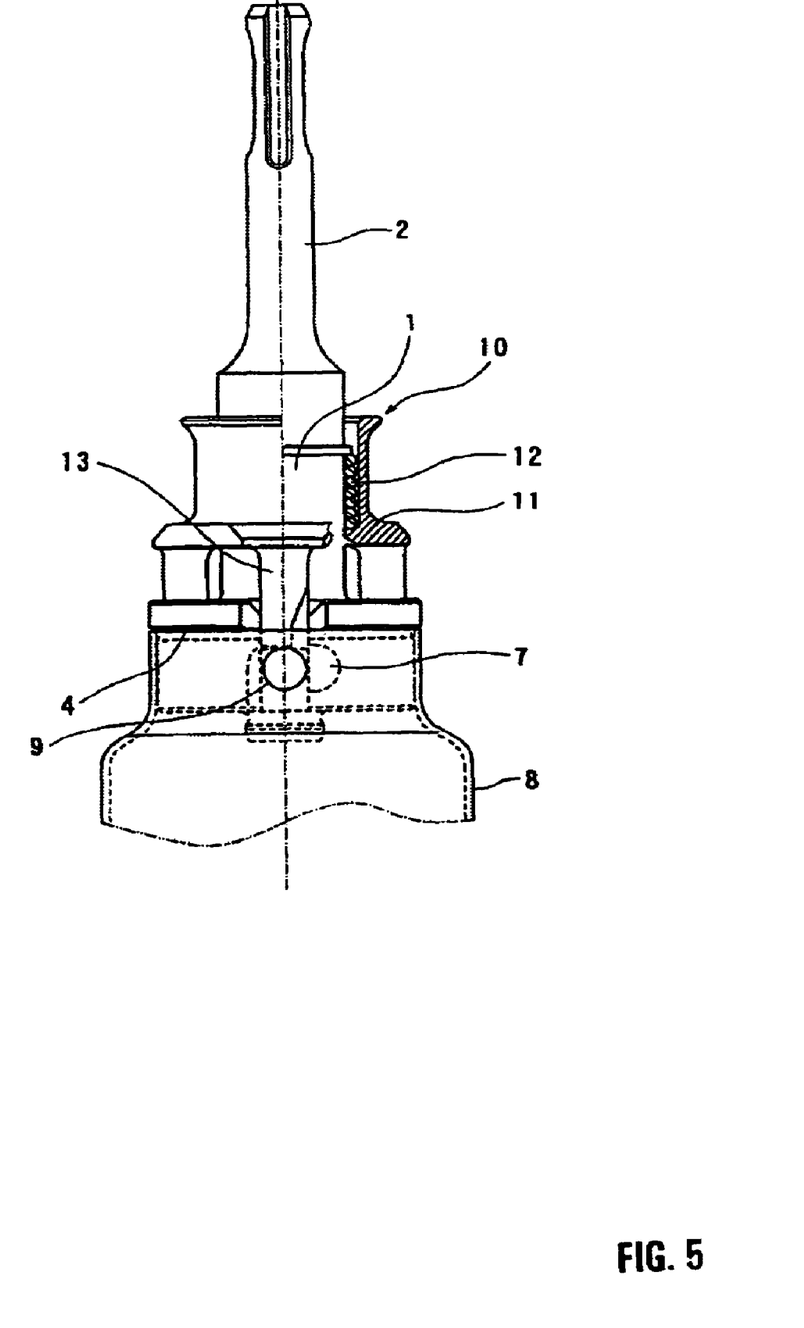
FIG. 5 is a view illustrating the manner of coupling between the core body and the base body, which shows a state where the insertion progresses from the state shown in FIG. 3 with an engagement pawl in an unlocking position at an upper location.
Figure 6:
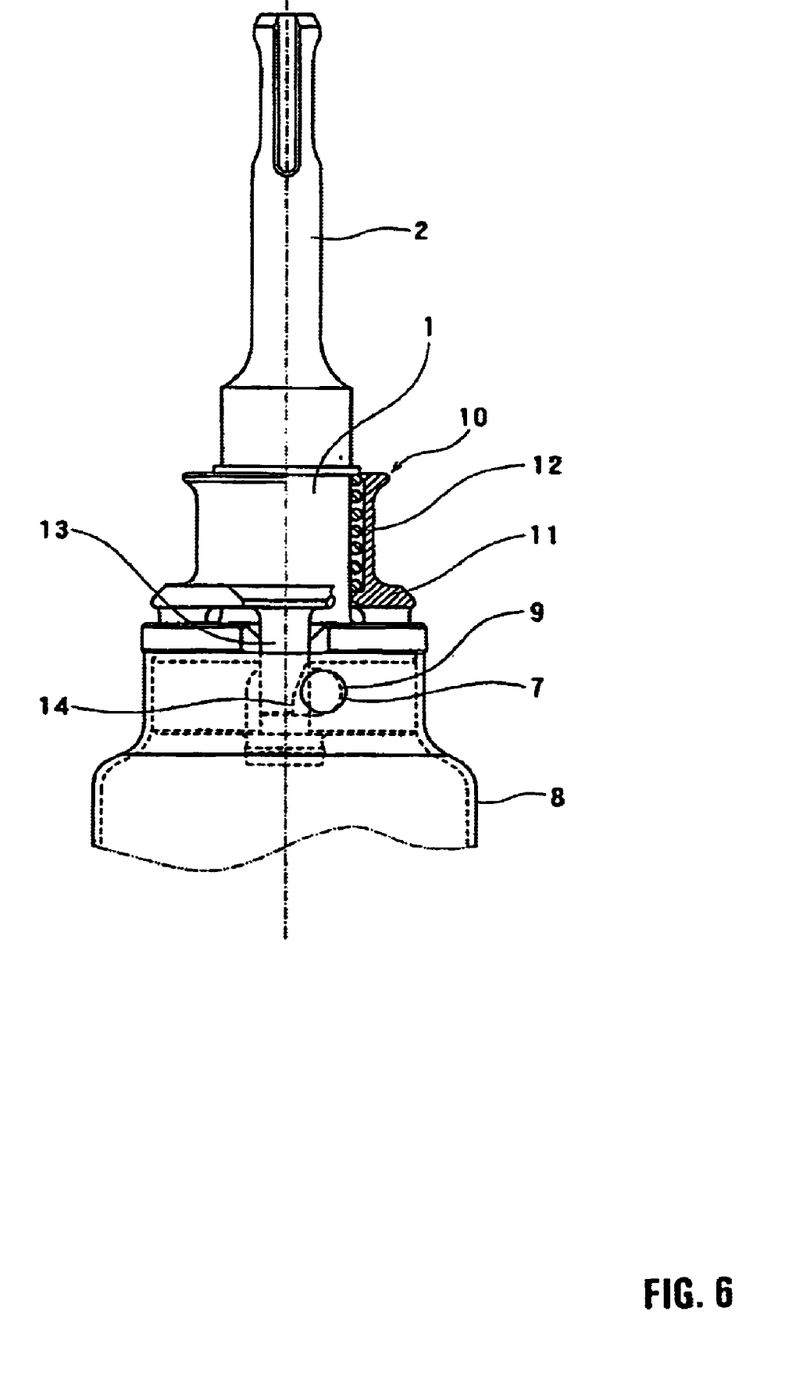
FIG. 6 is a view illustrating the manner of coupling between the base body and the core body, which shows a state where the engagement pawl abuts a back portion of an engagement projection of the core body to press against and lock the engagement projection.

Then, as shown in FIG. 5, when the upper end edge of the core body 8 becomes in abutment with the shoulder portion 4 of the base body 1, engagement pawl 13 moves to the unlocking position at an upper location to make concave groove portion 6 and engagement concave portion 7 continuous with each other. Subsequently, when the core body 8 is rotated relative to the base body 1 (in this embodiment the core body 8 is rotated clockwise relative to the base body 1), engagement projection 9 moves toward engagement concave portion 7. Under this condition, the back portion of engagement projection 9 sticks out into concave groove portion 6 as shown in FIG. 6. However, since engagement pawl 13 has a concave notch portion 14 at a lower side end thereof, engagement pawl 13 lowers the back portion of engagement projection 9 through the biasing force of the spring 12. This descent causes the back portion of engagement projection 9 sticking out toward concave groove portion 6 to enter concave notch portion 14, whereby engagement projection 9 located in engagement concave portion 7 is pressure-contacted and anchored by engagement pawl 13 and engagement concave portion 7 under the biasing by the compression spring 12 and, hence, the core body 8 is made stationary, namely, locked at that position. Of course, the concave section of engagement concave portion 7 is configured to fit the sectional shape of engagement projection 9 substantially conformably. Though a series of these attaching operations includes an axial motion and a rotational motion, these operations are performed in series and, hence, the coupling of the core body 8 to the base body 1 can be achieved on a so-called "one-touch" basis. In addition, the core body 8 is automatically locked relative to the base body 1 by the action of the spring 12 without necessity of any operation of the worker.

When the base body 1 and the core body 8 are to be separated from each other, the worker pulls up the stopper member 11 relative to the base body 1 against the compression spring 12 to cause engagement pawl 13 to move upward from the back portion of engagement projection 9 of the core body 8 thereby unlocking the core body 8 locked by engagement pawl 13. Thereafter, by reversing the aforementioned order of operations, it is possible to detach the core body 8 from the base body 1.

INDUSTRIAL APPLICABILITY

The present invention, which is practiced in the aforementioned mode, is capable of attaching the core body to the base body and automatically locking their coupling state and, hence, the coupling relation between the base body and the core body is fixed unless the stopper member is pulled up against the compression spring by an act of man. Accordingly, even if the core body is used with a rotary hammer drill, it is possible to perform a stable and highly reliable drilling operation. Further, since the engagement projection of the core body is constantly pressed by the force of the spring (resilient force) through the engagement pawl under biasing by the compression spring when the base body and the core body are in their attached state, the core body does not rattle relative to the base body and, hence, noise can be reduced.

What is claimed is:

1. A core body locking device of a core drill wherein: a base body having a shank at an upper part thereof is formed with a fitting portion at a lower part thereof, the fitting portion being formed at an outer periphery thereof with a core body attaching portion having a shoulder portion comprising a step portion, the core body attaching portion being provided with an engagement concave portion; a cylindrical core body having a drilling blade at a lower end edge thereof is formed with an engagement projection protruding inwardly from an internal surface of the core body at an internal surface of an upper end portion of the core body; and the upper end portion of the core body is fitted to the core body attaching portion of the base body by engagement of the engagement projection of the core body with the engagement concave portion of the base body, characterized in that:

the core body attaching portion of the base body is formed with a concave groove portion circumferentially adjacent to and continuous with the engagement concave portion and extending therefrom to a lower end of the base body; and a stopper member which has a lower end portion with an engagement pawl that is vertically movable within the concave groove portion and which is downwardly biased by a spring is disposed on the base body, wherein when the engagement pawl of the stopper moves to an unlocking position at an upper location, the concave groove portion of the core body attaching portion becomes continuous with the engagement concave portion, while when the engagement pawl moves to a locking position at a lower location, the engagement concave portion becomes separated from the concave groove portion by the engagement pawl.

2. The core body locking device of the core drill according to claim 1, wherein: the engagement concave portion is formed such that when the engagement projection is in a state engaging the engagement concave portion, the engagement projection is locked with its back portion sticking out toward the concave groove portion, while the engagement pawl of the stopper is provided with a concave notch portion for receiving the back portion of the engagement projection; and when the back portion of the engagement projection sticking out from the engagement concave portion is caused to enter the concave notch portion of the engagement pawl, the engagement pawl circumferentially presses against the back portion of the engagement projection by the biasing of the spring to lock the engagement projection of the core body.

3. The core body locking device of the core drill according to claim 1 or 2, wherein concave groove portions of the core body attaching portion are formed at three points equally distributed on an outer periphery of the core body attaching portion, while, correspondingly thereto, engagement projections of the core body are provided at three points equally distributed on an inner periphery of the core body.

4. A core body of a core drill which is engageable with and lockable to a base body when the core body is in a state attached to the base body, the base body being such that: the base body having a shank at an upper part thereof is provided with a attaching portion at a lower part thereof, the attaching portion being formed at an outer periphery thereof with a core body attaching portion having a shoulder portion comprising a step portion; the core body attaching portion is provided with an engagement concave portion and a concave groove portion circumferentially adjacent to and continuous with the engagement concave portion and extending therefrom to an lower end of the base body; and a stopper member which has a lower end with an engagement pawl that is vertically movable within the concave groove portion and which is downwardly biased by a spring, wherein when the engagement pawl of the stopper moves to an unlocking position at an upper location, the concave groove portion of the core body attaching portion becomes continuous with the engagement concave portion, while when the engagement pawl moves to a locking position at a lower location, the engagement concave portion becomes separated from the concave groove portion by the engagement pawl, characterized in that the core body is provided with an inwardly protruding engagement projection on an internal surface of an upper end portion of the core body at a location corresponding to the location of the concave groove portion, the engagement projection being capable of passing through the concave groove portion and being locked relative to the engagement concave portion.

5. The core body according to claim 4, wherein the engagement projection comprises a hemispherical projection.

6. The core body according to claim 4 or 5, wherein the engagement projection is formed at a location that is lower than an upper end of the core body to such an extent that at least an upper edge of the engagement projection does not contact the upper end of the core body.

7. The core body according to any one of claims 4 to 6, wherein the diameter of a lower end portion of the core body where the drilling blade is formed is different from the diameter of a portion of the core body to be attached to the base body.

8. The core body according to claim 5, wherein the engagement projection is formed at a location that is lower than an upper end of the core body to such an extent that at least an upper edge of the engagement projection does not contact the upper end of the core body.

* * * * *